United States Patent [19]

Lyon

[11] Patent Number: 5,466,287
[45] Date of Patent: Nov. 14, 1995

[54] INK COMPOSITION

[75] Inventor: Peter J. Lyon, Whitefield, England

[73] Assignee: Willett International Limited, United Kingdom

[21] Appl. No.: 385,067

[22] Filed: Feb. 7, 1995

Related U.S. Application Data

[63] Continuation of Ser. No. 104,051, filed as PCT/GB92/00276, Feb. 17, 1992, abandoned.

[30] Foreign Application Priority Data

Feb. 16, 1991 [GB] United Kingdom .................. 9103327

[51] Int. Cl.$^6$ ................................................ C09D 11/02
[52] U.S. Cl. ..................................... 106/20 R; 106/22 R
[58] Field of Search ............................... 106/20 R, 22 R

[56] References Cited

U.S. PATENT DOCUMENTS

| | | | |
|---|---|---|---|
| 4,070,322 | 1/1978 | Hwang et al. | 106/22 C |
| 4,106,027 | 8/1978 | Hoffmann et al. | 106/22 B |
| 4,352,901 | 10/1982 | Maxwell et al. | 106/20 D |
| 4,389,503 | 6/1983 | Maxwell et al. | 106/22 F |
| 4,849,770 | 7/1989 | Koike et al. | 106/22 H |
| 4,990,186 | 2/1991 | Jones et al. | 106/22 F |

FOREIGN PATENT DOCUMENTS

| | | |
|---|---|---|
| 0034972A1 | 2/1981 | European Pat. Off. . |
| 0034972 | 9/1981 | European Pat. Off. . |
| 2004904 | 4/1979 | United Kingdom . |

*Primary Examiner*—Helene Klemanski
*Attorney, Agent, or Firm*—Charles D. Gunter, Jr.

[57] ABSTRACT

The present invention relates to a composition and to a method for using it, notably to an ink containing an alkyl ester, to synergistic ink compositions containing the ester and a lower alkanol, and to a method for printing images with the ink compositions using an ink jet printer.

7 Claims, No Drawings

INK COMPOSITION

This is a continuation of application Ser. No. 08/104,051, filed as PCT/GB92/00276, Feb. 17, 1992, now abandoned.

The present invention relates to a composition and to a method for using it, notably to an ink containing an alkyl ester, to synergistic ink compositions containing the ester and a lower alkanol, and to a method for printing images with the ink compositions using an ink jet printer.

BACKGROUND TO THE INVENTION

A number of forms of ink jet printer have been used to apply ink compositions to a wide range of substrates. In many cases the ink is put up in the form of a solution or suspension in an organic solvent, notably MEK. The use of MEK provides an ink which is highly suitable for use in ink jet printers, since it gives an ink which can readily be jetted, which is aggressive to many plastic substrates so that the printed image adheres firmly to the substrate, and which dries rapidly so that the printed image resists smudging or smearing allowing the printed substrate to be handled almost immediately after printing. Furthermore, MEK readily dissolves most of the dyestuffs and other components used in ink compositions, giving the printer the freedom to use a wide range of ink compositions.

Despite the many technical advantages in the use of MEK and similar solvents, major problems arise in that such solvents are often toxic or present health hazards and are becoming less and less acceptable from an environmental standpoint. Thus, MEK is flammable and presents a health hazard, notably when vapours are inhaled or fluid contacts the skin, and it would be desirable to use a solvent or carrier medium for the ink which is physiologically acceptable, notably so as to allow the ink to be applied directly to a foodstuff or to packaging closely associated with a foodstuff.

It has therefore been proposed to use lower alkanols or water as the solvent or carrier medium for the ink. Whilst such solvent or carrier media reduce or avoid the physiological problems associated with the use of MEK, ink formulations using such a solvent or carrier dry slowly and spread upon contact with non-porous surfaces, notably many of the clay filled glossy surfaced papers currently used in the packaging industry, so that the printed image smears and loses its sharp definition. Furthermore, since many of the dyestuffs or other components required for the ink compositions are often insoluble or only slightly soluble in water or alkanols, the use of such solvent or carrier media limits the range of ink formulations the printer can use.

It has been proposed to use ethyl acetate as a carrier medium for pigment based inks in contact printing processes where the inks have a high viscosity, typically in excess of 100 Cps, and contain high levels of suspended pigments and binders. Such compositions are not suitable for use in an ink jet printer, where the ink must have a viscosity of less than 40 Cps and blockage of the fine nozzle orifices would occur due to the high level of solids in such inks.

Despite the fact that ethyl acetate has physiological advantages over the use of MEK, it is relatively non-polar and does not dissolve the salts and many of the dyestuffs now desirable for use in ink compositions for ink jet printers. However, we have found surprisingly that ethyl acetate produces an ink composition which does not spread as much as a corresponding ethanol based formulation when applied to a clay filled paper or other porous substrate.

Furthermore, we have found that mixtures of ethanol and ethyl acetate and their lower alkyl analogues behave synergistically and that the mixtures can be used as the solvent or carrier medium for a wide range of ink compositions. The solvent mixtures enhance the ability of the ethanol to dissolve the desired physiologically acceptable inks even where large proportions of ethyl acetate are present and retain the low spreading property of ethyl acetate. Furthermore, we have also found that the mixture of solvents results in compositions of reduced viscosity, which enhances their jet-ability through the fine orifice apertures of ink jet printers.

SUMMARY OF THE INVENTION

Accordingly, the present invention provides an ink composition suitable for application through the nozzle of an ink jet printer, which ink comprises an image forming ingredient dissolved or dispersed in a carrier medium, characterized in that the carrier medium comprises a mixture of a lower alkanol and a lower alkyl ester of a lower alkyl-carboxylic acid in which the alkyl moieties in the ester and alkanol contain from 1 to 5 carbon atoms and the total number of carbon atoms in the alkyl moieties of both the alkanol and the ester is from 5 to 8; in that the alkanol and ester are present in weight proportions of from 6:4 to 1:19; and in that the composition has a viscosity of less that 40 Cps at 25° C.

Preferably the image forming ingredient is dissolved in the carrier medium and, for convenience, the invention will be described hereinafter in terms of a solution of the image forming ingredient in a solvent medium.

Preferably, the alkyl moieties in the alkanol and ester contain from 1 to 3 carbon atoms; and the compositions are made from food grade or physiologically acceptable materials.

The solvent is preferably a mixture of a $C_1$ to $C_3$ alkanol with a $C_1$ to $C_3$ alkyl ester of a $C_1$ to $C_3$ aliphatic monocarboxylic acid in weight proportions of alkanol to ester of from 6:4 to 1:19, preferably from 6:4 to 1:9. Surprisingly, we have found that many dyestuffs are readily soluble in such solvent mixtures in greater amounts than where the alkanol or ester alone is used and the use of such mixtures of solvents enables a wider range of ink compositions to be used by the printer.

The invention further provides a process for printing an image with an ink composition of the invention, characterised in that the composition is applied through the nozzle orifice of an ink jet printer.

The ink jet printers are non-contact printers in which individual droplets of the ink are applied at individually selected positions on a substrate so as to form the desired image. The printer can be of the drop on demand type in which discrete droplets of ink are ejected from an array of nozzles past which the substrate passes, the nozzles being activated at the desired frequency and in the desired order to form the desired image on the substrate. Thus, the printer can be one in which ink under pressure flows to the nozzles via valving means which are actuated under the control of a computer or the like to allow ink to flow to the required nozzle to eject a droplet from that nozzle. Alternatively, ink can be fed to an ink chamber provided with a piezoelectric crystal which modifies the shape of the chamber when a voltage is applied to the crystal so as to eject a droplet of ink from a nozzle outlet to the chamber. For convenience, such types of printer will be designated generally hereinafter as drop on demand ink jet printers.

Alternatively, the droplets can be applied by what is known as a continuous ink jet printer in which ink is fed under pressure from a reservoir through a nozzle to form a jet of ink. This jet is broken up into discrete substantially uniformly sized and spaced apart droplets by applying vibration or pressure pulses to the ink. This can be achieved by vibrating the nozzle or the nozzle assembly by means of a piezoelectric crystal, or by immersing a vibration probe, for example a piezoelectric crystal rod, in the ink itself. The ink is charged by applying a voltage between the ink jet before it breaks up into droplets and a charge electrode, so that each droplet carries a known charge. The charged droplets then pass through a deflection electric field where they are deflected from their straight line of flight by the deflection field applied. The extent of deflection will determine the point at which the droplets strike a substrate passing the printer and the charge and/or deflection fields are varied to direct the droplets to the desired location on the substrate. Droplets which are not to be printed are not deflected but are caught in a catcher or gutter and are returned to the ink reservoir for re-use. Such ink jet printers are generally denoted as continuous ink jet printers hereinafter.

Many forms of the above types of printer are known and commercially available and may be used without modification in the method of the invention. For convenience, the invention will be described hereinafter in terms of an ink for use in a drop on demand ink jet printer where the ink need not necessarily contain conductive or polar materials, although such materials may coincidentally be present, for example by virtue of the mixture of solvents employed as described below.

As indicated above, the alkyl moieties in the alkanol and ester contain less than five carbon atoms. Thus the alkanol may be selected from methyl, ethyl, isopropyl, butyl or pentyl alcohol; and the ester may be selected from esters of such alcohols with formic, acetic, propionic or butyric acids. However, we have found that where the ester, acid and alkanol groups in the preferred mixed solvent medium all contain long chain moieties, the solubility of the dyestuff and any resin binder in the ink composition may be adversely affected. The alkyl moieties in the alkanol and ester therefore contain a total of from 5 to 8 carbon atoms. It is particularly preferred to use a mixture of an alkanol of the formula $HC_nH_{2n}OH$ and an ester of the formula $HC_mH_{2m}OOCC_pH_{2p+1}$, where the total of the sum of n+m+p is from 5 to 8. A particularly preferred alcohol is ethyl alcohol, which may be used in its pure or commercially available forms, for example as denatured alcohol or industrial methylated spirits. A particularly preferred ester is ethyl acetate.

Preferred solvent compositions for application through a drop on demand printer are those in which the ester predominates, i.e. in which the ethanol to ethyl acetate weight ratio is in the range 1:1 to 1:9.5, notably 1:1 to 1:9. However, where the composition is to be applied through a continuous jet printer, it is preferred that the alkanol to ester weight ratio be in the range 6:4 to 1:9, notably about 1:1.

The composition of the invention also contains an image forming component which is soluble or dispersed in the solvent/carrier medium. The image forming component can be of any suitable form having regard to the purpose to which the image on the substrate is to be put. Thus, the component can be one which fluoresces under ultra violet light or which can be detected by a magnetic reader. However, it is preferred that the component be one which forms a visible image on the substrate, for example a dyestuff which is soluble in a moderate to strongly polar solvent, or a pigment. For convenience, the invention will be described hereinafter in terms of a dyestuff.

The dyestuff for present use may be put up as a fluid composition in an aqueous, ethanol, ester or other solvent, for example in the solvent to be used as the solvent for the ink composition, and such a fluid incorporated into the solvent media for present use using any suitable mixing technique. The dyestuff may also be available in the form of a fine particulate solid or pigment, which is dissolved in the solvent medium. Many forms of suitable dyestuff are commercially available and may be used in their commercially available purity. However, some commercial dyestuffs contain extenders and residual salts from the neutralisation of sulphonic or other acidic groups in the dyestuff molecule. It is preferred to use dyestuffs which contain less than 5% by weight of these and other materials, excluding the solvent which may be present. When calculating the amount of ester and alkanol for use in the solvent medium in the ink compositions for use in the present invention, it will be necessary to allow for the alkanol and/or ester present in the dye composition and the amounts of alkanol and ester given herein relate to the total of such material from all sources present in the total composition.

It is preferred that the ink composition also contain one or more film forming resins to aid adhesion of the ink droplet to the substrate and to provide a measure of protection to the dried droplet against abrasion and the action of water or other solvents contacting the dried droplet. Typically, such resins will be organic resins as commonly used in ink compositions, and include, for example, acrylic co-polymers, rosin esters, shellac, polyvinyl esters, ketone resins, urea aldehyde resins, vinyl chloride/vinyl ether or vinyl acetate co-polymers, cellulose ethers and esters, polyamide resins, styrene/maleate resins, polyvinylpyrrolidone resins, vinyl pyrrolidone/vinyl acetate co-polymers, polystyrene resins, melamine resins, thermosetting acrylic resins, polyurethane resins and radiation curable acrylate resins. Such resins can be used in their commercially available forms.

It is preferred that the ink compositions for present use contain from 0.1 to 20% by weight of the dyestuff, preferably from 1 to 6%, notably less than 5% where the ester provides the sole solvent or carrier medium; and from 0.1 to 40%, preferably from 2 to 20%, by weight of the binder or film-forming component, based on the total weight of the ink composition. As indicated above, the compositions of the invention have a lower viscosity where the mixture of alkanol and ester solvents is used, typically less than 20 Cps, preferably less than 10 Cps, preferably 1 to 6 Cps, at 20° C.

Where the ink is to be applied through a continuous ink jet printer, it will usually be necessary to incorporate one or more ionic components into the ink so that it will have sufficient conductivity to accept the charge to be induced in it. Typically, it will be desired to use an ink composition with a conductivity of from 500 to 2500, preferably 750 to 1250, microSiemens per centimeter. This is achieved by the incorporation of one or more ionic materials into the ink, which may incidentally be present in one or more of the desired components, for example as salts in the dyestuff or the dyestuff itself. Suitable salts which may be added include ammonium, sodium or potassium salts of organic acids, such as acetic acid, lactic acid or propionic acid, or of thiocyanic acid. The ammoniation of a component of the ink composition may also be used to provide at least part of the conductivity required in the composition. Such an ammoniated component is often readily soluble in the solvent medium but reverts to a water insoluble form due to loss of the ammonia from the printed droplet, whereby the component provides the printed droplet with enhanced water resistant properties. It is preferred that the component to be ammoniated be a binder, notably an organic resin containing one or more carboxylic acid groups, for example shellac or a carboxylated acrylic resin.

We have found that the mixture of the ester and lower alkanol solvents will often have a conductivity equivalent to MEK and can thus be used without the need for added salts or other polar or ionic components. Preferred solvent mixtures for this purpose contain the alkanol and ester in weight proportions of from 6:4 to 1:9.

Where adequate conductivity cannot be achieved by the addition of the alkanol to the ester, the conductivity can be achieved by the addition of a salt to the composition as is known in the art, for example by the use of a dye which already contains a salt. The ammoniation of a component of the ink composition may also be used to provide at least part of the conductivity required in the composition. Such an ammoniated component is often readily soluble in the solvent medium but reverts to a water insoluble form due to loss of the ammonia from the printed droplet, whereby the component provides the printed droplet with enhanced water resistant properties. It is preferred that the component to be ammoniated be a binder, notably an organic resin containing one or more carboxylic acid groups, for example shellac or a carboxylated acrylic resin.

The ink compositions for present use can be made by any suitable method, for example by mixing together solutions of the components in one or more of the solvents and then diluting the mixture to the desired concentration with further solvent.

The ink compositions of the invention and their application through a commercially available drop on demand ink jet printer will now be described by way of illustration in the following Examples in which all parts and percentages are given by weight unless stated otherwise:

EXAMPLE 1

An ink composition was made by mixing ethanol (IMS 99) and ethyl acetate in various proportions as set out below and dissolving a commercially available black dye in the mixture of solvents. The compositions were assessed for their viscosity in Cps at 20° C. and for the amount of insoluble material recovered after passing the composition through a 3 micrometer aperture membrane to assess the amount of insoluble material in the composition. A high level of insoluble material indicates a low level of dissolution of the dyestuff in the composition and hence a high risk of blockage of the ink jet printer nozzle. The results of these tests are set out below:

Compositions:

A: 100 parts ethanol; 14 parts dye
B: 50 parts ethanol, 50 parts ethyl acetate, 14 parts dye
C: 100 parts ethyl acetate; 14 parts dye
Viscosity:

Composition A: 2.14 Cps
Composition B: 1.26 Cps
Composition C: 0.99 Cps
Insoluble material, expressed as a percentage of the total dye present:

Composition A: 0.18%

-continued

Composition B: 0.22%
Composition C: 14.94%

The compositions were applied as droplets through a conventional drop on demand ink jet printer as sold by the Applicants to a clay filled paper surface which had a glossy surface. Composition A dried rapidly, but wicked into the surrounding paper to give a spread dot. Composition B dried rapidly and did not wick significantly into the surrounding paper. Composition C was difficult to apply due to the high level of insoluble material in the composition, but gave a faint printed dot image which did not spread significantly into the surrounding paper surface.

EXAMPLE 2

The process of Example 1 was repeated with two different dyes and the results were generally the same and confirmed that the compositions containing the mixed solvent showed a reduced viscosity as compared to the compositions using 100% ethanol as the solvent, whilst retaining the low levels of insoluble materials and good dot image quality.

EXAMPLE 3

Ink compositions were made up from 84% of solvent, 4% Solvent Black 47 and 12% carboxylated acrylic resin binder. The solvent was a mixture of ethyl acetate and ethanol (IMS) in weight proportions as set out below. The inks were assessed for their viscosity and the results were as follows:
Solvent composition:

| (Ethyl acetate: IMS) | 90:10 | 80:20 | 70:30 | 60:40 | 50:50 | 40:60 |
|---|---|---|---|---|---|---|
| Viscosity: | 1.79 | 1.80 | 1.94 | 2.03 | 2.21 | 2.41 |

All samples were stable with little insoluble residues. The residues could readily be filtered out to give stable solutions for application through a drop on demand ink jet printer to give good printed droplets.

EXAMPLE 4

The process of Example 3 was repeated using ink compositions containing:

100% ethyl acetate;

98% ethyl acetate: 2% IMS; and 95% ethyl acetate: 5% IMS.

With the first two solvent mixtures, excessive residual insoluble materials were noted, which would require filtration before use in a drop on demand ink jet printer. By way of contrast, the last composition gave a stable solution with little residual solids and a viscosity of 1.624, showing that a minimum of about 5% of IMS is required to dissolve the dyestuff substantially completely.

EXAMPLE 5

Ink compositions were made using a variety of different alkanols and esters at weight ratios of 50:50 and 1:9 in compositions containing 84 parts of solvent, 4 parts of dye and 12 parts of carboxylated acrylic resin binder. The ink were assessed for their viscosity, drying properties when applied to polyethylene sheet and for the adhesion of the printed droplet to polyvinylchloride. The spread of the printed droplets expressed as multiples of the diameter of the droplets as initially applied was also determined.

The results were as follows:

| Composition: | Viscosity Cps at 20° C. | Drying time | Spread on PE |
|---|---|---|---|
| 50/50 EA/IMS | 2.21 | 1–5 | none |
| 50/50 EA/IPA | 2.40 | 5–10 | none |
| 50/50 EA/BOH | 2.70 | 15–20 | 2 |
| 50/50 EB/IMS | 2.54 | 15–20 | 2–3 |
| 50/50 EB/IMS | 3.07 | 10–15 | 1½–2 |
| 50/50 EB/BOH | 3.95 | 20–25 | 2 |
| 50/50 BA/IMS | 2.53 | 5–10 | none |
| 50/50 BA/IPA | 3.18 | 15–20 | 1½–2 |
| 50/50 BA/BOH | 3.61 | 10–15 | 2–3 |
| 90/10 EA/IMS | 1.79 | 1–5 | none |
| 90/10 EA/IPA | 1.69 | 5–10 | none |
| 90/10 EA/BOH | 1.86 | 10–15 | none |
| 90/10 EB/IMS | 1.07 | 10–15 | 1½–2 |
| 90/10 EB/IPA | 1.02 | 5–10 | 2–3 |
| 90/10 EB/BOH | 0.42 | 15–20 | 2–3 |
| 90/10 BA/IMS | 1.69 | 10–15 | 2 |
| 90/10 BA/IPA | 1.27 | 5–10 | 2–3 |
| 90/10 BA/BOH | 1.18 | 10–15 | 2 |

IMS = Industrial methylated spirits,
EA = ethyl acetate,
IPA = isopropyl alcohol,
BOH = butan-1-ol,
EB = ethyl butyrate,
BA = butyl acetate All but the last six solvent mixtures dissolved the resin and dyestuff to give stable solutions. In the case of the last six mixtures, the resin was not completely dissolved. Furthermore, the drying time increased with the length of the alkyl chains in the alcohol or ester.

The ink compositions were applied to a PVC tube and the rub and scratch resistance assessed. The removal of the ink by peeling off a strip of adhesive tape applied to the printed drops was also assessed. The inks performed almost as well as a conventional MEK solvent based ink, indicating that the solvent mixtures would cause printed images to adhere at least in part by fusion with the underlying plastic substrate.

EXAMPLE 6

An ink composition was prepared from ethyl acetate (36.3 parts), IMS (36.2 parts), Orasol Black dye (15 parts), the polyketone resin sold under the Trade Mark Laropol K80 (5 parts), the polyvinyl butyral resin sold under the Trade Mark Pioloform BN 18 (2.5 parts) and propylene gycol monomethyl ether (5 parts). This ink composition had a viscosity of 3.4–3.6 Cps at 20° C. and printed well to give a sharp image with no significant spreading.

I claim:

1. An ink composition suitable for application through the nozzle of an ink jet printer, which ink composition comprises an image forming ingredient dissolved or dispersed in a carrier medium, comprising a mixture of a lower alkanol and a lower alkyl ester of a lower alkyl carboxylic acid, wherein:
   a. the alkanol contains from 1 to 4 carbon atoms, the ester is ethyl acetate and the total number of carbon atoms in the alkyl moieties of both the alkanol and the ester is from 5 to 8; and
   b. the alkanol and the ester are present in weight proportions of from 65:35 to 35:65; and
   c. the composition has a viscosity of less that 40 Cps at 25° C.

2. A composition as claimed in claim 1, wherein the image forming ingredient is dissolved in the carrier medium.

3. A composition as claimed in claim 1, wherein the composition is made from food grade or physiologically acceptable materials.

4. A composition as claimed in claim 1, wherein the solvent is a mixture of a $C_1$ to $C_3$ alkanol with ethyl acetate in weight proportions of alkanol to ethyl acetate of from 60:40 to 40:60.

5. A composition as claimed in claim 1, wherein the alkanol is ethyl alcohol.

6. A composition as claimed in claim 1, further comprising a film forming resin.

7. A process for printing an image by applying an ink composition to a substrate by an ink jet printer, the method comprising the steps of:
   formulating an ink composition which ink composition comprises an image forming ingredient dissolved or dispersed in a carrier medium, comprising a mixture of a lower alkanol and a lower alkyl ester of a lower alkyl carboxylic acid, wherein:
   a. the alkanol contains from 1 to 4 carbon atoms, the ester is ethyl acetate and the total number of carbon atoms in the alkyl moieties of both the alkanol and the ester is from 5 to 8;
   b. the alkanol and the ester are present in weight proportions of from 65:35 to 35:65;
   c. the composition has a viscosity of less that 40 Cps at 25° C.; and
   applying the ink composition so formulated as discrete droplets to individually selected positions on the substrate by ejecting the ink formulation through the nozzle orifice of an ink jet printer so as to form an image.

* * * * *